United States Patent [19]
Joyce

[11] Patent Number: 6,141,605
[45] Date of Patent: Oct. 31, 2000

[54] DETERMINING THE DIRECTION OF TRAVEL OF AN AUTOMOTIVE VEHICLE FROM YAW RATE AND RELATIVE STEERING WHEEL ANGLE

[75] Inventor: John Patrick Joyce, Grosse Pointe Park, Mich.

[73] Assignee: Ford Global Technologies, Inc., Dearborn, Mich.

[21] Appl. No.: 09/344,385

[22] Filed: Jun. 25, 1999

[51] Int. Cl.[7] .................................................. G06F 19/00
[52] U.S. Cl. .............................. 701/1; 701/41; 180/421; 180/443
[58] Field of Search .................................. 701/1, 41, 42, 701/70, 72; 180/400, 412, 413, 421, 422, 443

[56] References Cited

U.S. PATENT DOCUMENTS

| | | | |
|---|---|---|---|
| 4,984,646 | 1/1991 | Sano et al. | 180/79.1 |
| 5,436,831 | 7/1995 | Erhardt et al. | 701/1 |
| 5,513,720 | 5/1996 | Yamamoto et al. | 180/421 |
| 5,557,520 | 9/1996 | Suissa et al. | 701/41 |
| 5,579,228 | 11/1996 | Kimbrough et al. | 701/41 |
| 5,631,836 | 5/1997 | Poggenburg et al. | 701/1 |
| 5,640,324 | 6/1997 | Inagaki | 701/72 |
| 5,710,704 | 1/1998 | Gräber | 701/72 |
| 5,732,372 | 3/1998 | Marsden | 701/41 |
| 5,787,375 | 7/1998 | Madau et al. | 701/41 |
| 5,790,966 | 8/1998 | Madau et al. | 701/41 |

*Primary Examiner*—Gary Chin
*Attorney, Agent, or Firm*—Gregory P. Brown

[57] ABSTRACT

A method of using relative steering wheel angle of an automotive vehicle, vehicle yaw rate, and vehicle speed to determine whether the vehicle is traveling forward or backward. Forward and backward steering wheel angles are calculated from vehicle speed and yaw rate (22). A difference between relative steering wheel angle and forward steering wheel angle (10), and a difference between relative steering wheel angle and backward steering wheel angle (12) are calculated. The difference between relative steering wheel angle and forward steering wheel angle is filtered (14), and a difference between the filtered and the unfiltered difference between relative steering wheel angle and forward steering wheel angle is calculated to obtain a forward net difference (18). The difference between relative steering wheel angle and backward steering wheel angle is filtered (16), and a difference between the filtered and the unfiltered difference between relative steering wheel angle and backward steering wheel angle is calculated to obtain a backward net difference (20). While repeatedly performing the foregoing steps, forward net difference values derived from the forward net differences are accumulated (24), and backward net difference values derived from the backward net differences are accumulated (26). The travel direction is determined by comparing the accumulation of forward net difference values and the accumulation of backward net difference values (28). Absolute steering wheel angle and road bank angle can also be calculated.

11 Claims, 3 Drawing Sheets

| SPEED STATE | SPIN STATE | ALL WHEELS STABLE | "SET VALUES AT REST" | "DETERMINE ACCUMULATED SWA ERRORS" | "RESET FILTERED SWA DIFF." | "UPDATE FILTERED SWA DIFF." |
|---|---|---|---|---|---|---|
| DIRECTION MAY HAVE CHANGED SPEED STATE | "DON'T CARE" | "DON'T CARE" | ENABLED | DISABLED | ENABLED | DISABLED |
| HIGH SPEED STATE | VEHICLE MAY BE SPINNING | "DON'T CARE" | DISABLED | DISABLED | ENABLED | DISABLED |
| HIGH SPEED STATE | VEHICLE IS NOT SPINNING | TRUE | DISABLED | ENABLED | DISABLED | ENABLED |
| HIGH SPEED STATE | VEHICLE IS NOT SPINNING | FALSE | DISABLED | DISABLED | ENABLED | DISABLED |

DETERMINING THE DIRECTION OF TRAVEL OF AN AUTOMOTIVE VEHICLE FROM YAW RATE AND RELATIVE STEERING WHEEL ANGLE

BACKGROUND OF THE INVENTION

1. Field of the Invention

This invention relates generally to automotive vehicle dynamics, and more particularly to improvements in processing data from certain on-board sensors, including a steering wheel relative position sensor and a yaw rate sensor, to derive information useful for control of certain aspects of vehicle dynamics through one or more control systems.

2. Background Information

Certain motion sensors, such as steering wheel position sensors and yaw rate sensors for example, provide useful inputs to an automotive vehicle control system. Such a control system utilizes a microprocessor that processes data, including input signal measurements received from such sensors, to cause adjustments in and/or actuations of control devices. The responses of such sensors can be sufficiently fast in relation to vehicle motion that their signal measurements can very closely track changing values of the respective measured parameters in real time. Accordingly, a microprocessor-based control system which receives such signal measurements as inputs can quickly process them to perform desired control action, such as performing a control function that strives to correct for rapidly changing vehicle dynamics via an appropriate system of the vehicle.

Certain automotive vehicle control systems, such as a stability assist control system, require an input that identifies the correct direction of actual vehicle travel with a very high degree confidence so that proper control functions can be executed, plausibility checks for confirming integrity of the system and sensors can be carried out, and offsets and calibrations of sensors can be established. In common driving situations, the direction of vehicle travel can be determined from the particular drive gear selected. Certain situations where this is not true can occasionally arise. Examples of those situations include vehicles spins, neutral gear selection, a vehicle rolling down a grade, a vehicle lacking sufficient traction to climb a grade and sliding down in a direction opposite the selected gear, and a failure that causes the gear selection information to be incorrect or unavailable.

In general, a dynamic relationship exists between the steering wheel angle and the vehicle yaw rate. For a steady state operating condition at a given speed and a given absolute steering wheel angle, the yaw rate has approximately the same magnitude whether the vehicle is traveling forward or backward. The sign of the yaw rate changes (+/−) when the direction is changed, but the magnitude does not change significantly. This sign reversal is also true during dynamic vehicle maneuvers, but during such maneuvers, the difference in magnitude is greater than that for the steady state condition because the vehicle is steered by turning the leading wheels, and not the trailing ones. This relationship between the absolute steering wheel angle and vehicle yaw rate can be used to determine travel direction of the vehicle.

A sensor which measures absolute steering wheel angle provides a signal of the absolute position of the steering wheel angle relative to a known reference point and at present is significantly more expensive than one which measures relative steering wheel angle. A sensor which measures relative steering wheel angle provides a signal only of relative change in the steering wheel angle. For example, when a relative steering wheel angle sensor is off and the steering wheel is turned, the sensor does not detect the turning. An absolute steering wheel angle sensor will be able to distinguish new steering wheel angle positions regardless of whether the sensor has been off during the period of time in which the change in steering wheel angle was made.

It is believed that an ability to correctly identify the direction of vehicle travel without relying exclusively on gear selection and without using an absolute steering wheel angle sensor would be advantageous.

SUMMARY OF THE INVENTION

The invention relates to a method for correctly identifying the direction of vehicle travel without relying exclusively on gear selection and without using an absolute steering wheel angle sensor. The method advantageously uses a relative steering wheel angle measurement and a yaw rate measurement to determine the vehicle travel direction. A further advantage is that the inventive method can be embodied either entirely, or at least in large part, in an existing vehicle system without additional hardware. This is because the disclosed solution provided by implementation of the invention can be in the form of software programmed into existing microprocessor-based systems. Such a solution is especially desirable for mass-produced automotive vehicles because they accomplish new and useful functions in a cost-effective manner.

One generic aspect of the invention relates to a method of determining whether an automotive vehicle is traveling in a forward or backward direction from information reflecting changes in the steering wheel angle (relative movement), yaw rate of the vehicle, and vehicle speed, the method comprising the steps of: measuring relative steering wheel angle; measuring yaw rate; measuring vehicle speed; calculating a forward steering wheel angle from vehicle speed and yaw rate; calculating a backward steering wheel angle from vehicle speed and yaw rate; calculating a difference between relative steering wheel angle and forward steering wheel angle; calculating a difference between relative steering wheel angle and backward steering wheel angle; filtering the difference between relative steering wheel angle and forward steering wheel angle; calculating a difference between the filtered and the unfiltered difference between relative steering wheel angle and forward steering wheel angle to obtain a forward net difference; filtering the difference between relative steering wheel angle and backward steering wheel angle; calculating a difference between the filtered and the unfiltered difference between relative steering wheel angle and backward steering wheel angle to obtain a backward net difference; while repeatedly performing the foregoing steps, accumulating forward net difference values derived from the forward net differences, and accumulating backward net difference values derived from the backward net differences; and determining travel direction by comparing the accumulation of forward net difference values and the accumulation of backward net difference values.

Another generic aspect of the invention relates to a method of determining whether an automotive vehicle is traveling in a forward or backward direction from information reflecting changes in the steering wheel angle (relative movement), yaw rate of the vehicle, and vehicle speed, the method comprising the steps of: measuring relative steering wheel angle; measuring yaw rate; measuring vehicle speed; calculating one of a forward and a backward steering wheel angle from vehicle speed and yaw rate; calculating a difference between relative steering wheel angle and the calculated one of a forward and a backward steering wheel angle; filtering the calculated difference; determining that the vehicle is traveling in the one of the forward and the backward directions; and calculating the absolute steering wheel angle by adding the filtered difference to the relative steering wheel angle.

Still another aspect relates to measuring the road bank angle by tuning the method to be sensitive to changes in steering wheel angle which are induced by driving on banked roads.

Other general and more specific aspects will be set forth in the ensuing description and claims.

BRIEF DESCRIPTION OF THE DRAWINGS

The drawings that will now be briefly described are incorporated herein to illustrate the inventive principles via an exemplary preferred embodiment and a best mode presently contemplated for carrying out those principles.

FIG. 3 is a related logic chart.

DESCRIPTION OF THE PREFERRED EMBODIMENT(S)

Figure 1:
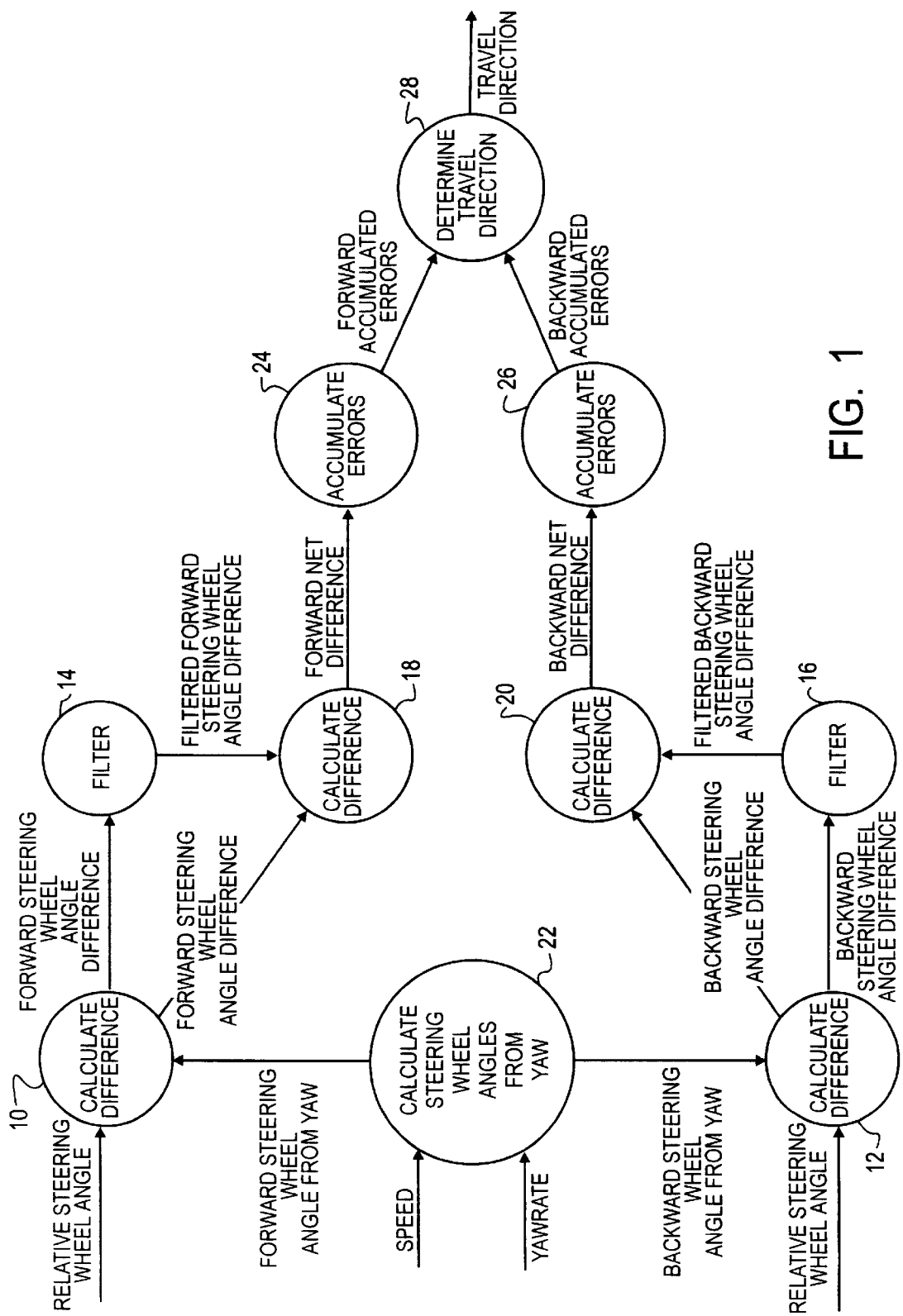
FIG. 1 is a general schematic flow diagram of a method according to principles of the present invention.

In an automotive vehicle, the inventive method is practiced using inputs from a relative steering wheel angle sensor, a yaw rate sensor, and a vehicle speed sensor. Such sensors are present in known automotive vehicles. Information from these sensors is processed electronically in an on-board processor in accordance with the inventive method. A description of the method is presented with reference to FIG. 1.

A Relative Steering Wheel Angle input from the relative steering wheel angle sensor and a Forward Steering Wheel Angle From Yaw input are processed by a difference calculation step 10 to yield a Forward Steering Wheel Angle Difference. The Relative Steering Wheel Angle input from the relative steering wheel angle sensor and a Backward Steering Wheel Angle From Yaw input are processed by a difference calculation step 12 to yield a Backward Steering Wheel Angle Difference. Each result is determined from a known relationship that applies to the respective direction of travel, and each result is calculated regardless of the particular direction of vehicle travel. For each calculation, it is the magnitude of the result that is important, rather than which one of the inputs is subtracted from the other. Certain sign reversals and changes may be trivial and can be allowed or compensated for at various stages of the total algorithm.

Step 14 denotes processing the Forward Steering Wheel Angle Difference through a filter to create a Filtered Forward Steering Wheel Angle Difference. Step 16 denotes processing the Backward Steering Wheel Angle Difference through a filter to create a Filtered Backward Steering Wheel Angle Difference.

A difference calculation step 18 processes the Forward Steering Wheel Angle Difference and the Filtered Forward Steering Wheel Angle Difference to produce a Forward Net Difference. A difference calculation step 20 processes the Backward Steering Wheel Angle Difference and the Filtered Backward Steering Wheel Angle Difference to produce a Backward Net Difference.

The Forward Steering Wheel Angle From Yaw is calculated from the vehicle speed signal and the yaw rate signal by a step 22.

The foregoing steps are repeatedly executed as the vehicle is traveling. Consequently updated values for both the Forward Net Difference and the Backward Net Difference are periodically obtained. Because of the fast processing speed, the updated values are generated at a fast update rate.

A value derived from each updated value of the Forward Net Difference is accumulated in an accumulator, as shown by a step 24. A value derived from each updated value of the Backward Net Difference is accumulated in an accumulator, as shown by a step 26. In the case of the first accumulator, the accumulation of values is referred to as Forward Accumulated Errors, while in the case of the second, it is referred to as Backward Accumulated Errors.

A step 28 processes the Forward Accumulated Errors and the Backward Accumulated Errors to determine Travel Direction of the vehicle. The determination can be one of three possibilities: Forward; Backward; or Indeterminate.

The filtering referred to above may be performed by filter designs appropriate for achieving desired performance. The following are examples of such designs.

A first-order filter with fast response may be used to determine travel direction quickly. A first-order filter with slow response may be used to determine travel direction with higher confidence and establish a reference point for determining the absolute steering wheel angle. A notch filter, stop-band filter, band-pass filter, or any other appropriate filter may be used to reject frequency components which are due to sensor errors or unstable vehicle dynamics that may occur during vehicle sliding, spinning, skidding, or individual tires nearing or exceeding their limits of adhesion to the road surface and that occasion deviation in the characteristic relationship between yaw, steering wheel angle, and vehicle speed. The frequencies passed or rejected by the filter functions may also be changed dynamically in response to estimates of driving surface friction or roughness, vehicle speed, or other factors which vary the pertinent characteristics of the signals of interest.

Figure 2:
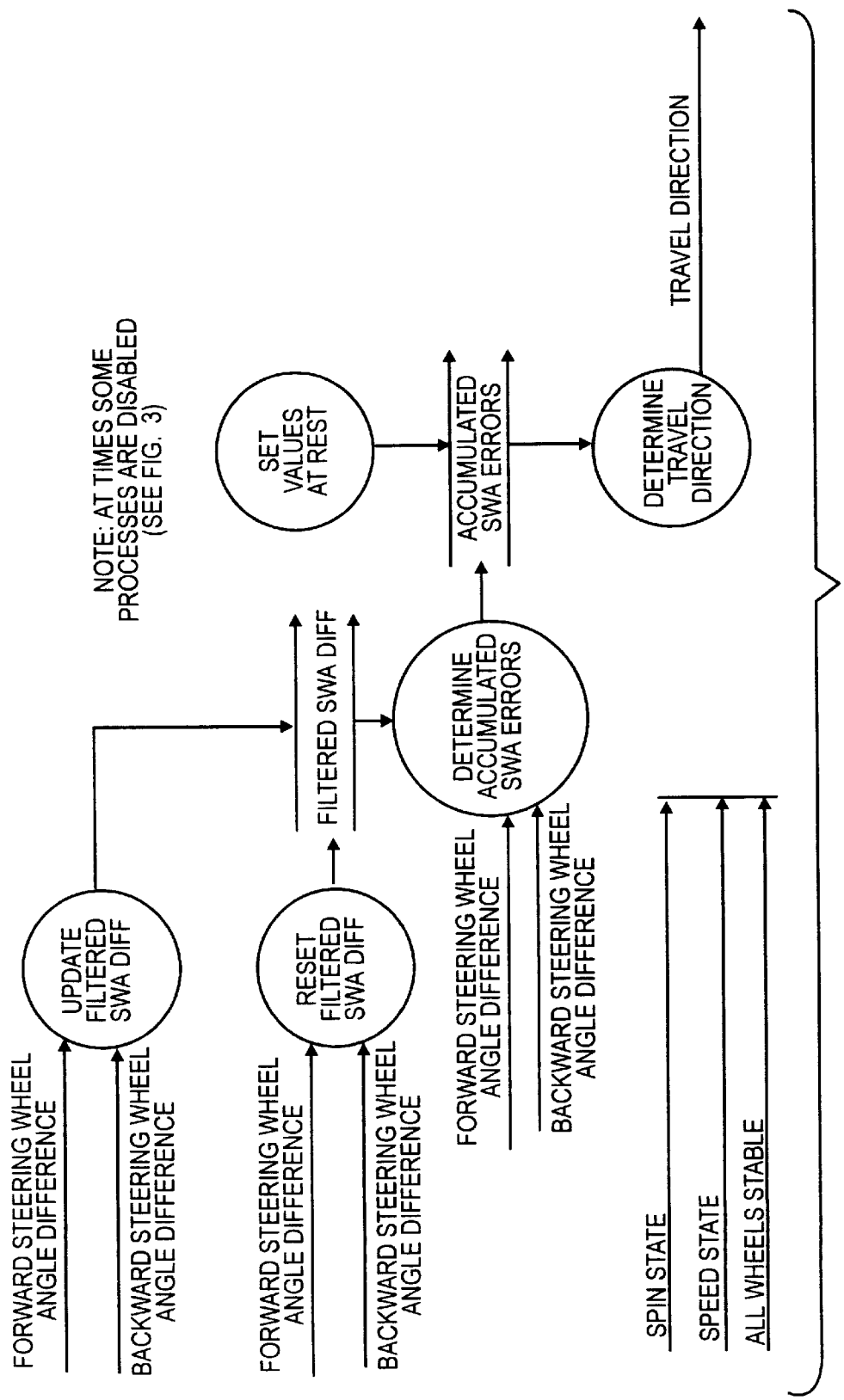
FIG. 2 is a related control diagram.

FIG. 2 and FIG. 3 illustrate a control strategy for the generalized method of FIG. 1. The control strategy monitors certain aspects of vehicle dynamics and depending on the nature of those aspects selectively allows and disallows difference accumulations by steps 24 and 26. For allowing the differences to be accumulated, the vehicle must not be spinning, all wheels must be stable, and the vehicle must be traveling above a predefined minimum speed. This is represented by the third line of the chart of FIG. 3, and by the portion 30 of FIG. 2.

If the vehicle is spinning, any wheel is not stable, or the vehicle speed is below the predefined minimum, the control strategy does not allow accumulations to occur.

If the vehicle speed is below the predefined minimum, it is considered to be at rest, at which time, certain values may be set in the accumulators.

Various rules, modifications, and limits may be applied to the manner in which net difference values are accumulated in order to make the accumulations robust to transient disturbances induced from the vehicle, sensor disturbances, quantization errors due to measurement or calculation, low signal-to-noise ratios on the pertinent signals during times when there is little steering wheel angle or yaw rate change. The basic objective to be achieved is that when the vehicle is actually traveling forward, the forward accumulation becomes much smaller than the backward accumulation, and when the vehicle is traveling backward, the opposite is true. During driving situations where steering wheel angle is not being changed significantly, both accumulations grow slowly and at approximately the same rate.

Examples of rules, modifications, and limits which may be applied singly or in combination to the manner in which the net difference values are accumulated to produce accumulations are: accumulating the absolute value of the net difference; accumulating a net difference value only when it exceeds a certain magnitude; accumulating only the portion of a net difference value that exceeds a certain magnitude; stopping further accumulations once one of the accumulations has grown significantly large; limiting the net difference value that can be added to an accumulation; interrupting accumulations at times when the characteristic relationship between yaw, vehicle speed, and steering wheel angle is invalid, such as in situations mentioned earlier.

Various rules, modifications, and limits may be applied to the manner in which the accumulations are compared in order for improving robustness of the inventive method. Examples which may be applied singly, or in combination, include: ratioing one accumulation to the other and deferring a determination of travel direction until the ratio crosses a predefined threshold; deferring a determination of travel direction until an accumulation is significantly large; and adding to one or both accumulations before they are ratioed to change the magnitude of the ratio for small accumulations.

That the inventive method performs well is demonstrated by the following. When the vehicle is turning, the steering wheel angle difference remains relatively constant as the steering wheel angle from yaw is being calculated, assuming the correct direction of travel. Thus, the difference between the filtered steering wheel angle difference and the steering wheel angle difference will also be small and due only to less than ideal behavior. When the same calculations are carried out assuming the incorrect direction of travel, the accumulations grow significantly faster when the steering wheel angle is being changed.

It should be noted that the relationships just mentioned are true for stable vehicle dynamics on level ground and that care should be taken during unstable vehicle dynamics, such as transitions in road bank angle and very low speed travel. Measures which can be taken include: interrupting the accumulations; interrupting the updating of filtered data; resetting the accumulations immediately after such events; accelerating the filter response times temporarily after such events; and tuning limits and constants mentioned above such that the calculations are robust to such events.

The accumulations may or may not continue to grow indefinitely. Because of storage media limitations, limits may be imposed on the accumulations and while sufficient resolution is maintained. To effectively update the accumulations several strategies may be employed. One example is that once an accumulation has grown sufficiently large to confidently predict the travel direction, further accumulation ceases. Another is reducing both accumulations when either one approaches its storage limit.

Other features which may improve performance of the inventive method include: accelerating the response of the outputs of the systems by dynamically changing the filter response such that as more information is obtained, the filter becomes less responsive. A simple implementation of such a strategy is to initialize the filtered steering wheel angle difference to the first value of steering wheel angle difference and thereafter use the applicable filter rules. When the direction of vehicle travel may have changed, it is also desirable to reset the filtered steering wheel angle difference values as well as the accumulations.

An absolute steering wheel angle which can be meaningfully used in a stability assist system can be determined utilizing methodology of the present invention. Once the travel direction has been determined, the filtered steering wheel angle difference corresponding to the travel direction, either the filtered forward steering wheel angle difference or the filtered backward steering wheel angle difference, will represent the offset between the relative of steering wheel angle and the absolute steering wheel angle. To accomplish this, the filtering must have a fairly slow response. Because such a slow response is typically unacceptably slow for determining travel direction, different filters with different response times may be selectively used as needed when the method principles are used for determining both travel direction and absolute steering wheel angle.

Because the absolute steering wheel angle changes on a banked road surface, the relative change in absolute steering wheel angle, as determined above, can also be used to determine the road bank angle. This is done in the following manner. The absolute steering wheel angle is determined, as described, and then filtered to produce a filtered absolute steering wheel angle. The filter response time should be comparable to the time required to transition the vehicle onto and off of a bank. The assumption is made that over an extended period of time the vehicle will be driven on a level road surface. An additional filtered value of the absolute steering wheel angle, referred to as long term absolute steering wheel angle, is maintained by a slow response filter. The difference between the filtered absolute steering wheel angle and long term absolute steering wheel angle is the angle induced to maintain the straight vehicle travel along the inclined bank surface. While this induced, incremental angle is related to the road bank angle, it is also as a function of speed and yaw rate. Consequently converting the value to a road bank angle will be a function of parameters unique to each vehicle.

While a presently preferred embodiment has been illustrated and described, it is to be appreciated that the invention may be practiced in various forms within the scope of the following claims. While the foregoing description refers to use of specific sensors for measuring the variables of interest, values for those variables may be obtained in ways other than from such sensors, for example by appropriate calculation and/or estimation techniques that yield values suitable for use by the disclosed algorithm.

What is claimed is:

1. A method of using relative steering wheel angle of an automotive vehicle, yaw rate of the vehicle, and speed of the vehicle to determine whether the vehicle is traveling in a forward direction or a backward direction, the method comprising the steps of:

measuring relative steering wheel angle;

measuring yaw rate;

measuring vehicle speed;

calculating a forward steering wheel angle from the vehicle speed and the yaw rate;

calculating a backward steering wheel angle from the vehicle speed and the yaw rate;

calculating a difference between the relative steering wheel angle and the forward steering wheel angle;

calculating a difference between the relative steering wheel angle and the backward steering wheel angle;

filtering the difference between the relative steering wheel angle and the forward steering wheel angle;

calculating a difference between the filtered and the unfiltered difference between the relative steering wheel angle and the forward steering wheel angle to obtain a forward net difference;

filtering the difference between the relative steering wheel angle and the backward steering wheel angle;

calculating a difference between the filtered and the unfiltered difference between the relative steering wheel angle and the backward steering wheel angle to obtain a backward net difference;

while repeatedly performing the foregoing steps, accumulating the forward net difference values derived from the forward net differences, and accumulating the backward net difference values derived from the backward net differences; and determining travel direction by comparing the accumulation of the forward net difference values and the accumulation of the backward net difference values.

2. A method as set forth in claim 1 in which the determining step comprises determining a backward travel direction when the accumulation of the forward net difference values exceeds the accumulation of the backward net difference values by a predetermined value.

3. A method as set forth in claim 1 in which the determining step comprises determining a forward travel direction when the accumulation of the backward net difference values exceeds the accumulation of the forward net difference values by a predetermined value.

4. A method as set forth in claim 1 in which the step of accumulating the forward net difference values comprises accumulating a forward net difference value for a respective forward net difference only if the forward net difference exceeds a predetermined forward net difference, and the step of accumulating the backward net difference values comprises accumulating a backward net difference value for a respective backward net difference only if the backward net difference exceeds a predetermined backward net difference.

5. A method as set forth in claim 4 in which the step of accumulating the forward net difference values comprises accumulating each forward net difference value as a value equal to difference between the respective forward net difference and the predetermined forward net difference, and the step of accumulating the backward net difference values comprises accumulating each backward net difference value as a value equal to difference between the respective backward net difference and the predetermined backward net difference.

6. A method as set forth in claim 1 including the steps of limiting further accumulation of the forward net difference values when their accumulation exceeds a predetermined forward limit, and of limiting further accumulation of the backward net difference values when their accumulation exceeds a predetermined backward limit.

7. A method as set forth in claim 1 including the steps of interrupting further accumulation of the forward net difference values and of interrupting further accumulation of the backward net difference values during certain vehicle operating conditions where actual relationships between the yaw rate, the vehicle speed, and the steering wheel angle deviate from certain predefined relationships.

8. A method as set forth in claim 1 including the steps of calculating a ratio of the accumulation of one of the net difference values to the accumulation of the other of the net difference values, and of allowing the determining step to be performed only when the ratio meets a predefined threshold.

9. A method of using relative steering wheel angle of an automotive vehicle, yaw rate of the vehicle, and speed of the vehicle to determine whether the vehicle is traveling in a forward direction or a backward direction, the method comprising the steps of;

measuring yaw rate;

measuring vehicle speed;

calculating one of a forward and a backward steering wheel angle from the vehicle speed and the yaw rate;

calculating a difference between the relative steering wheel angle and the calculated one of the forward and the backward steering wheel angle;

filtering the calculated difference;

determining that the vehicle is traveling in the one of the forward and the backward directions based on the relative steering wheel angle, the yaw rate and the vehicle speed; and calculating an absolute steering wheel angle by adding the filtered difference to the relative steering wheel angle.

10. A method as set forth in claim 9 in which the determining step comprises processing the relative steering wheel angle, the yaw rate, and the vehicle speed according to an algorithm to yield a determination of the travel direction of the vehicle.

11. A method as set forth in claim 9 including calculating a road bank angle for a surface on which the vehicle is traveling comprising the steps of:

processing the absolute steering wheel angle through a relatively higher pass filter to obtain a filtered absolute steering wheel angle, and processing the absolute steering wheel angle signal through a relatively lower pass filter to obtain a long term absolute steering wheel angle;

calculating a difference between the filtered absolute steering wheel angle and the long term steering wheel angle; and calculating the road bank angle by processing the difference between the filtered absolute steering wheel angle and the long term steering wheel angle with the vehicle speed, the yaw rate, and one or more physical parameters of the vehicle.

* * * * *